April 20, 1954 — R. LINCKE — 2,676,068

ADJUSTABLE JOURNAL BEARING

Filed March 13, 1951

INVENTOR.
REINHOLD LINCKE
BY
Emory L. Groff

Patented Apr. 20, 1954

2,676,068

UNITED STATES PATENT OFFICE 2,676,068

ADJUSTABLE JOURNAL BEARING

Reinhold Lincke, Offenbach, Germany, assignor to MSO Maschinen- und Schleifmittelwerke, Offenbach, Germany, a German firm Application March 13, 1951, Serial No. 215,242

Claims priority, application Germany
March 16, 1950

3 Claims. (Cl. 308—65)

This invention relates to a bearing adjustable during rotation of the shaft, spindle or the like supported thereby, and is concerned with a novel construction to compensate for shaft wear which is distinguished from the known arrangements by its simple construction, simple means of adjustment, and the ready access to the adjustment member and small space requirement so that the novel bearing can also be used under most unfavorable conditions.

According to the invention, in a radial bearing having a bearing bushing non-rotatably arranged in a housing, the said bushing is divided by two deep incisions into three composite sections which only remain connected with one another by a cross-piece or connecting web in such manner that the middle section is capable of being distorted or rocked with respect to the alignment of two other sections. For this purpose, the middle section is provided with a radial abutment surface engaged by an adjusting screw arranged in the housing. Said middle section has a smaller external diameter and its wall is thinner than the walls of the end sections which are non-rotatably held in housing to permit and to facilitate the said distortion. By means of this arrangement, the middle section at the side where the adjusting screw engages can thus always be maintained with bearing pressure on the shaft or spindle and thereby hold the latter on the opposite surfaces of the two end sections of the bearing bushing, which then takes up the working pressure.

The novel construction only requires the space of an ordinary bearing. The adjusting screw does not require any special space in the bearing housing and is accessible at any time. It thereby constitutes the only adjusting member, so that, as compared with a non-adjustable bearing, it is possible, simply by slitting the bearing bushing and arranging the adjusting screw in the housing, to obtain an adjustability which can be varied at any time.

For a better understanding of the invention and to show how the same may be carried into effect, the same will now be described with reference to the accompanying drawings, wherein.

Similar reference characters designate corresponding parts throughout the several figures of the drawings.

Figure 1:
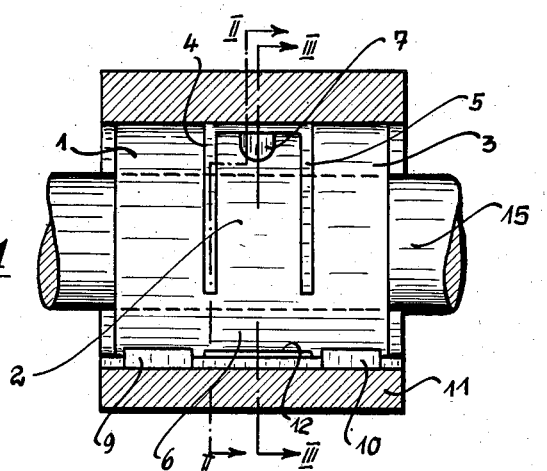
Figure 1 is a longitudinal section through the bearing on the line I—I of Figure 2.
Figure 2:
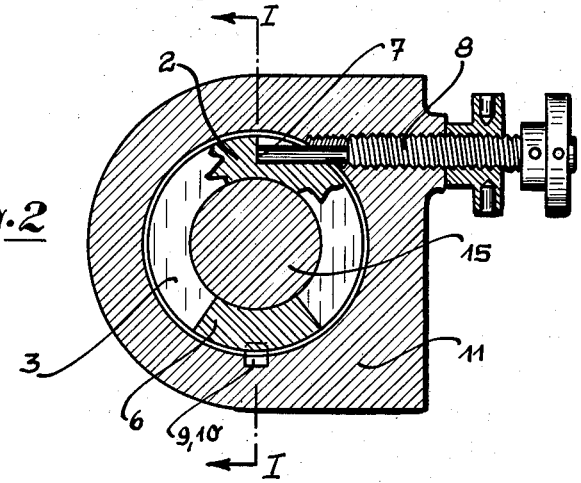
Figure 2 is a cross section on the line II—II of Figure 1.

Accommodated in the usual manner in the bearing housing 11, is a bearing bushing in which the shaft 15 is rotatably mounted. The bushing is divided into three sections 1, 2, 3 by two deep incisions 4, 5 disposed perpendicularly to the axis, said sections only being connected with one another by a web or cross-piece 6 in such manner that the middle section 2 can be twisted or hinged relatively to the end sections 1, 3. The external diameter 12 of the middle section 2 is also made somewhat smaller than that of the two end sections, 1, 3, which are non-rotatably held in the housing 11 by keys 9, 10 or the like.

Figure 3:
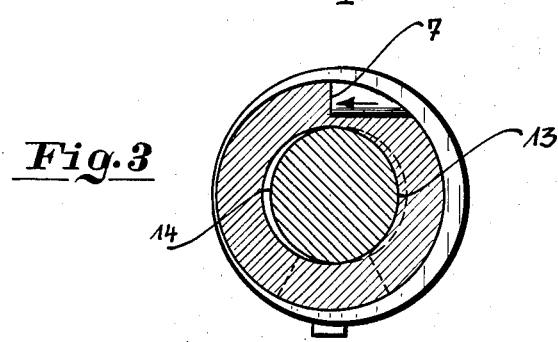
Figure 3 is a section on the line III—III of Figure 1 in a larger and exaggerated scale.

The middle section 2 is provided on the side opposite the cross piece 6 with a radial bearing or abutment shoulder 7 on which can operate an adjusting screw 8 of the bearing housing 11. By feeding the adjusting screw 8 forward, the middle section 2 can be swung or hinged about the connecting web or piece 6 with respect to the end sections 1, 3. Consequently, the surface 13 of the middle section 2 (Fig. 3) presses against the shaft 15 and urges the latter against the opposite surfaces 14 of the end sections 1, 3, so that the working pressure of the shaft or spindle 15 is always taken up uniformly by the surfaces 13, 14 and can easily be regulated at any time by the adjusting screw 8.

I claim:

1. An adjustable journal bearing, comprising, in combination, a housing, a bushing in the housing, said bushing having end sections and a middle section whose annular interior diameters normally register, said sections formed by incisions extending partially circumferentially about the bushing leaving a web connecting the middle section with the end sections, said middle section being thinner walled than the end sections to facilitate lateral distortion about the web, a radial abutment on the middle section formed at the end of a recess therein, key means between the bushing and housing for non-rotatably connecting the same, and an adjusting screw mounted in the housing and having one end bearing against the abutment shoulder of the middle section and its other end disposed outside of the housing for manual manipulation to move the middle section laterally and cause the shaft to firmly bear against the end sections.

2. In a radial bearing including a housing, a bearing bushing non-rotatably mounted in said housing and adjustable during rotation of the shaft, said bearing bushing being divided into two end sections and a middle section by two deep partially circumferential incisions disposed transversely to the axis of said bushing, said sections having a continuous annular cross-section throughout their entire length, a cross-piece integral with and connecting all said sections, and means for adjusting said middle section along its axis with respect to the said end sections along their axes.

3. In a radial bearing including a housing, a bearing bushing non-rotatably mounted in said housing and adjustable during rotation of the shaft, said bearing bushing being divided into two end sections and a middle section by two deep partially circumferential incisions disposed transversely to the axis of said bushings, said middle section having an external diameter smaller than the external diameter of the two end sections, said sections having a continuous annular cross-section throughout their entire length, a cross piece integral with and connecting all said sections, and means for adjusting said middle section along its axis with respect to the said end sections along their axes.

References Cited in the file of this patent

UNITED STATES PATENTS

| Number | Name | Date |
| --- | --- | --- |
| 514,331 | McGuire | Feb. 6, 1894 |
| 967,853 | Subber | Aug. 16, 1910 |
| 1,509,677 | Lees | Sept. 23, 1924 |
| 1,863,667 | Miranda | June 21, 1932 |
| 1,947,559 | Mackensen | Feb. 20, 1934 |